United States Patent
Turchetti

(10) Patent No.: US 12,278,584 B2
(45) Date of Patent: Apr. 15, 2025

(54) ELECTRONIC BRAKING SYSTEM FOR AN ELECTRIC MOTOR IN THE ABSENCE OF AN ELECTRICAL SUPPLY

(71) Applicant: FAAC S.P.A., Zola Predosa (IT)

(72) Inventor: Claudio Turchetti, Casalecchio di Reno (IT)

(73) Assignee: FAAC S.P.A., Zola Predosa (IT)

( * ) Notice: Subject to any disclaimer, the term of this patent is extended or adjusted under 35 U.S.C. 154(b) by 83 days.

(21) Appl. No.: 18/133,418

(22) Filed: Apr. 11, 2023

(65) Prior Publication Data

US 2023/0387833 A1 Nov. 30, 2023

(30) Foreign Application Priority Data

May 26, 2022 (IT) .......................... 102022000011015

(51) Int. Cl.
*H02P 3/12* (2006.01)
*H02K 11/21* (2016.01)
*H02P 3/06* (2006.01)

(52) U.S. Cl.
CPC ............... *H02P 3/06* (2013.01); *H02K 11/21* (2016.01)

(58) Field of Classification Search
CPC ..... H02P 3/06; H02P 3/12; H02P 3/22; H02K 11/21
See application file for complete search history.

(56) References Cited

U.S. PATENT DOCUMENTS

| 4,333,270 A * | 6/1982 | Catlett | ................. E05F 15/614 49/336 |
|---|---|---|---|
| 2004/0066159 A1 | 4/2004 | Zack et al. | |
| 2013/0221888 A1 * | 8/2013 | Horikoshi | ................. H02P 3/22 318/400.29 |
| 2015/0137717 A1 * | 5/2015 | Ishikawa | ................. H02P 3/12 318/379 |

FOREIGN PATENT DOCUMENTS

| JP | H11128587 A | 5/1999 |
|---|---|---|
| JP | 4180460 B2 | 11/2008 |

OTHER PUBLICATIONS

European Patent Office; Search Report/Written Opinion; Italian Application No. IT 202200011015; dated Jan. 12, 2023; 8 pgs.

* cited by examiner

*Primary Examiner* — Cortez M Cook
(74) *Attorney, Agent, or Firm* — Kilpatrick Townsend & Stockton LLP

(57) ABSTRACT

An electronic braking system for an electric motor (2) in the absence of an electrical supply comprising a braking circuit (6), a control circuit (5) comprising a microcontroller (51) which controls said braking circuit and an enabling switch (8) which connects said control (5) and braking circuits to the electrical connections of the motor when power (7) is removed from it. The braking circuit carries out a PWM modulation of the induced voltage signal generated by the motor in rotation, when the power supply is removed from it and said control circuit controls the "duty cycle" of said modulation.

8 Claims, 1 Drawing Sheet

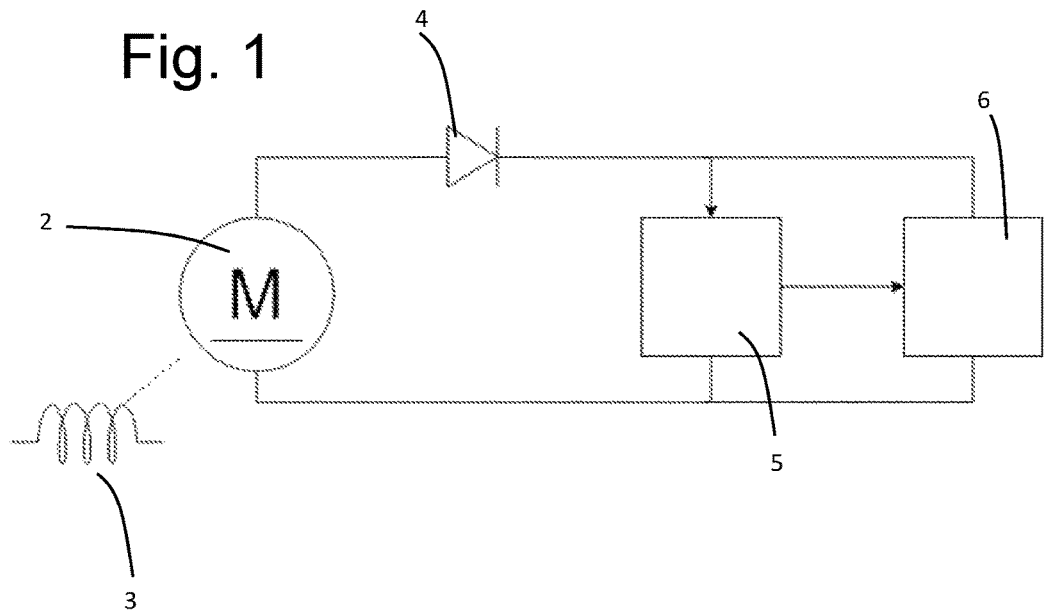
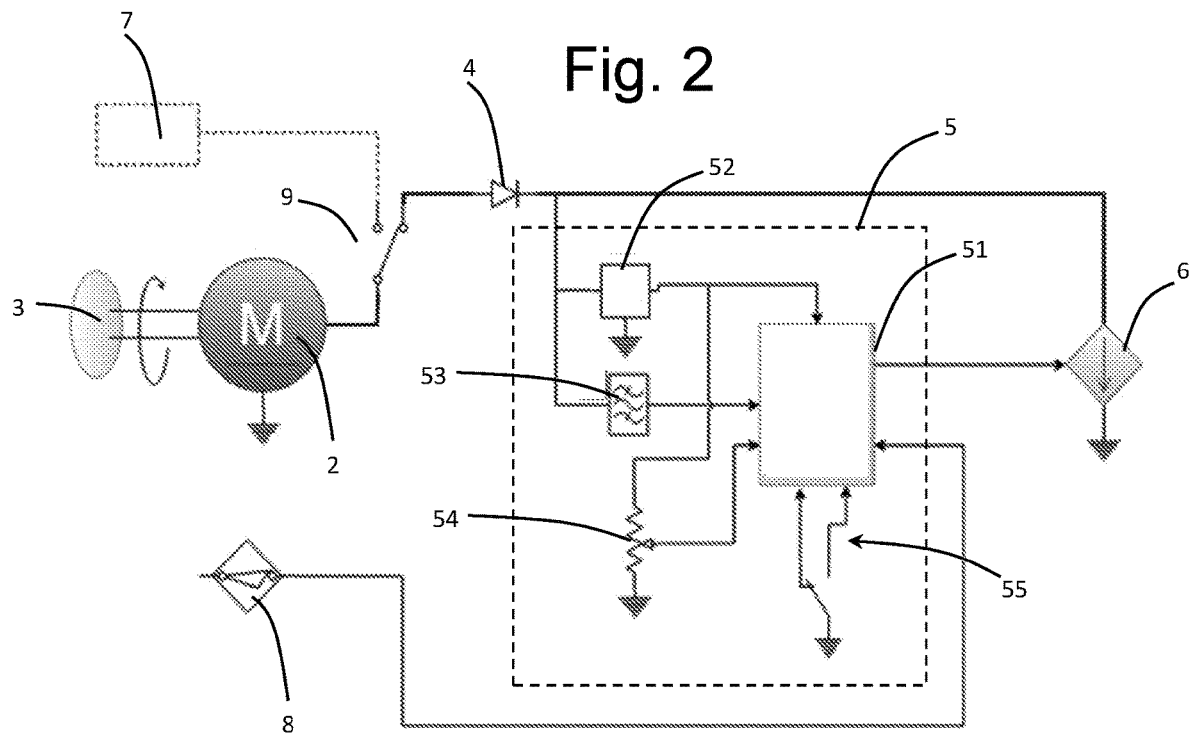

ELECTRONIC BRAKING SYSTEM FOR AN ELECTRIC MOTOR IN THE ABSENCE OF AN ELECTRICAL SUPPLY

CROSS-REFERENCE TO RELATED APPLICATIONS

The present application claims the benefit of priority to Italian Application No. IT 202200011015, filed May 26, 2022, which application is incorporated herein by reference in its entirety for all purposes.

The present invention relates to an electronic braking system for an electric motor in the absence of an electrical supply.

In particular, the present invention relates to an electronic braking system for an electric motor in which the rotation is to be slowed down (until the rotation of the crankshaft stops) when it is without power supply voltage. Such a system is used, for example, in the automatic swing door sector. A typical application is the one related to a door leaf, which is opened manually, in the absence of power supply, by overcoming the force of a spring that is loaded during such opening. The leaf automatically closes again due to the force of the preloaded spring, the leaf returns to the closed position. In such cases, the last part of the movement is desired to be faster than the first part, and therefore the motor is required to be used as a braking device for the leaf movement. In these cases it is desired to release the brake in the last fraction of the movement in order to, for example, trigger a lock. Another example occurs in the opposite situation, wherein the closure of a door is motor driven, while its opening is adjusted by a spring, and the motor has to act as a brake; such a situation occurs in escape routes or in smoke evacuation. In these cases, but not exclusively, a slowdown is desirable to prevent the leaf from hitting against an end-of-stroke device, or against a wall.

There are many products, in the market segment of the swing door driving devices that use circuits that, in the event of a power supply failure or electrical failure, slow down the speed of the door.

Many examples may be found that use passive components or linear circuits.

For example, when the power supply voltage in the motor is interrupted, it operates like a dynamo, generating electrical energy. Such energy is dissipated by a dissipation circuit that comprises one or more dissipation resistors.

These solutions generally cause heating problems in the printed circuit board due to the dissipation of linear elements (e.g. the resistor(s)).

The present invention proposes an electronic braking system for an electric motor in the absence of an electrical supply that solves such problems.

One aspect of the present invention relates to an electronic braking system for an electric motor having the characteristics of the attached claim 1.

Further features of the present invention are contained in the dependent claims.

The characteristics and advantages of the present invention will become more apparent from the following description of an embodiment of the invention, provided by way of non-limiting example, with reference to the schematic attached drawings, wherein:

FIG. 1 shows a block diagram of a general electric braking system applied to an electric motor;

FIG. 2 shows a block diagram of the electric braking system applied to the motor of a door leaf according to an embodiment of the invention.

With reference to the above-mentioned figures, the braking system according to the present invention is applied to an electric motor 2 in order to slow down and then stop rotation thereof when the power supply to that motor has been interrupted. In the embodiment shown in FIG. 3, the motor 2 moves a door leaf, allowing it to be opened. The door leaf closes again thanks to the counteracting action of a spring 3 that is loaded when the leaf is opened, returns its compression force to the leaf when the power source is disconnected, allowing it to close again.

The braking system according to the present invention allows, alternatively, either to release the brake to increase the speed, or to slow down, in the last part of the leaf movement, by braking or releasing the rotation of the motor against the spring action.

Obviously the present invention may be applied to any application where it is required to brake the rotation of an electric motor when the electrical supply has been removed from it, either because of a fault or due to a determined choice.

The principle underlying the system is that of exploiting the counter-electromotive force that is generated in an electric motor when the power supply is removed from it, which behaves in such conditions, like an electric generator. Such an electromotive force is supplied to the braking circuit, which dissipates it, thus braking the rotation (see, e.g. FIG. 1 showing such principle).

The system generally comprises a unidirectional element 4 designed to prevent the intervention of the braking system in the manually controlled direction of rotation, a control circuit 5 which manages the intervention of a braking circuit 6, designed to dissipate the induced counter-electromotive force, when the rotating motor is disconnected from its normal power supply circuit 7.

The braking circuit 6 according to the present invention receives the voltage induced by the motor and carries out a PWM modulation, so as to adjust such induced voltage thereby obtaining an average voltage, lower than the induced one, dependent on the ratio of the duration of the positive pulse to the whole period. The induced voltage is adjusted and dissipated by the motor and, in part, by such a circuit, thereby braking the motor rotation.

The controlled current source, which limits the speed of the motor, may be achieved in several ways.

An example of such a circuit comprises a PWM-modulated MOSFET, the PWM being generated by a microcontroller of the control circuit 5.

The control circuit determines the "duty cycle" of the induced voltage signal, i.e. the ratio of the duration of the "high" signal to the total signal period.

The advantage of this solution is that power dissipation is maintained at values that do not require additional heat sinks or the like for the braking circuit and also for the control circuit.

The control circuit comprises a microcontroller 51 a voltage regulator circuit 52 that takes the voltage induced by the motor stabilises it and supplies it as a power supply to such microcontroller 51. Said control circuit also comprises a circuit 53 for detecting the speed of rotation of the motor, implemented for example by a low-pass filter of the induced voltage, which provides the information to the microcontroller, and a threshold generator circuit 54 (e.g. made with a trimmer).

Such threshold determines the speed of rotation of the motor.

The system according to the present invention further comprises a system enabling switch 8 which connects the control and braking circuit to the motor electrical connections when power 7 is removed from it.

The system also comprises a position sensor 8 of the crankshaft rotation. In addition, the control circuit comprises a selector 55.

The microcontroller receives the signal from the position sensor 8 in order to activate or deactivate the braking circuit when a predefined angular position of the crankshaft is reached. The selector 55 allows to select a minimum or maximum braking speed.

The circuit operates as follows:

The setting of the cruising speed is carried out by the threshold generator circuit 54. Such information is compared with the voltage exiting the circuit 53, which represents the current speed of rotation of the motor. A control algorithm generates the correct control value to be sent to the braking circuit 6, so that the voltage detected by the circuit 53 is equal to the threshold value set by the circuit 54.

The system according to the present invention achieves the following advantages:

- A first advantage is being able to select, by means of the selector 55, the circuit operating mode, when the crankshaft position reaches and exceeds the position preset by the sensor 8. This makes it possible to choose between:
  a) having a high final speed, to facilitate, for example, arranging a lock, or
  b) a low final speed, in order to have a light approach to the stop end position.

A second advantage is that through modulation, energy is dissipated mainly in the motor, rather than in the circuit board. This makes it possible to avoid using heatsinks or large-size components on the board.

Another advantage is the easy choice of the cruising speed, via, for example, a signal trimmer. Also, the final speed (after engaging the position given by 8) can easily be varied, e.g. by modifying the Software in the microcontroller 51.

The invention claimed is:

1. An electronic braking system for an electric motor (2) in the absence of an electrical supply comprising:
    a braking circuit (6),
    a control circuit (5) comprising a microcontroller (51) which controls said braking circuit, wherein said control circuit comprises a voltage regulator circuit (52) which takes the voltage induced by the electric motor stabilizes it and supplies it as a power supply to said microcontroller (51);
    an enabling switch (8) that connects said control circuit (5) and braking circuit (6) to the electrical connections of the motor when power is removed from it (7), characterized in that the braking circuit carries out a PWM modulation of the induced voltage signal generated by the motor in rotation, when the power supply is removed from it and said control circuit controls the duty cycle of said modulation.

2. The system according to claim 1, wherein said braking circuit comprises a PWM modulated MOSFET, the PWM being generated by the microcontroller of the control circuit (5).

3. The system according to claim 1, wherein the electronic motor has a crankshaft and the system further comprising a position sensor (8) of the rotation of the crankshaft, the microcontroller receiving the signal from the position sensor, so as to activate the braking circuit when a predefined crankshaft angular position is reached.

4. The system according to claim 3, wherein the control circuit comprises a selector (55) which allows to select a minimum or maximum braking speed.

5. The system according to claim 1, wherein the electronic motor has a crankshaft and the system further comprising a position sensor (8) of the rotation of the crankshaft.

6. The system according to claim 1, comprising a unidirectional element (4) designed to prevent the intervention of the braking system during normal use of the motor.

7. The system according to claim 1, wherein a control circuit comprises a circuit (53) for detecting the speed of rotation of the motor.

8. The system according to claim 1, in which the motor (2) is associated with the leaf of an automatic swing door.

* * * * *